W. K. RANKIN.
ENGINEER'S VALVE FOR TRAIN BRAKES.
APPLICATION FILED JAN. 15, 1909.
942,280.
Patented Dec. 7, 1909.
2 SHEETS—SHEET 1.
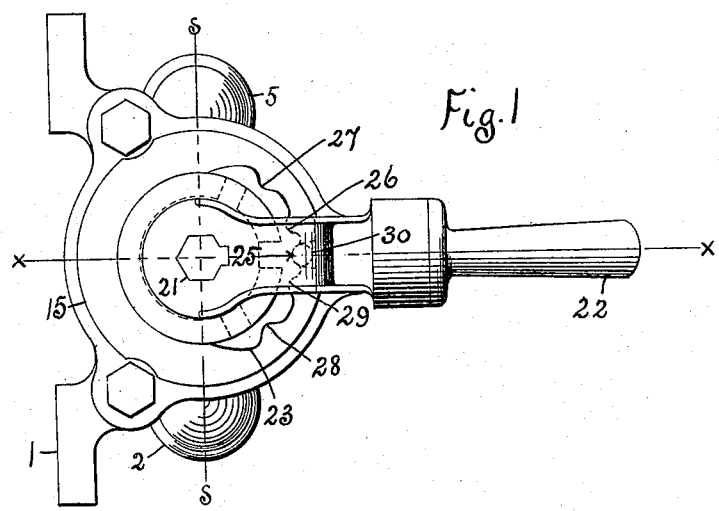
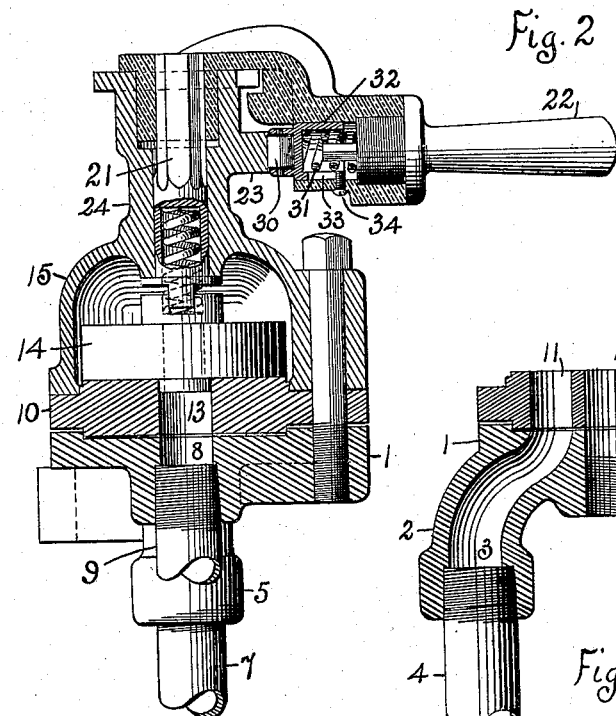
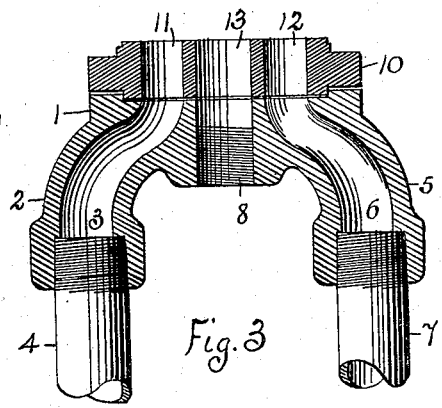
Witnesses.
Henry F. Colvin
Fred L. Jahn.
Inventor.
Wm. K. Rankin.
By R. C. Wright
Atty.

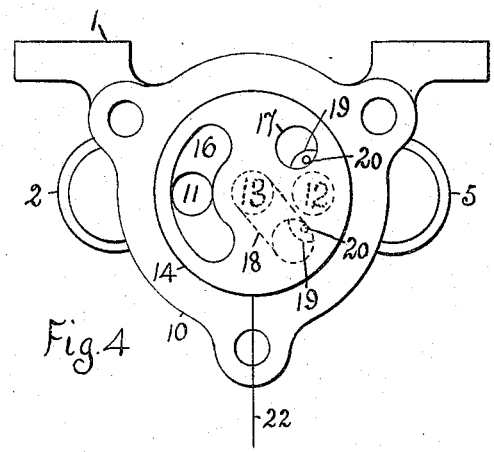
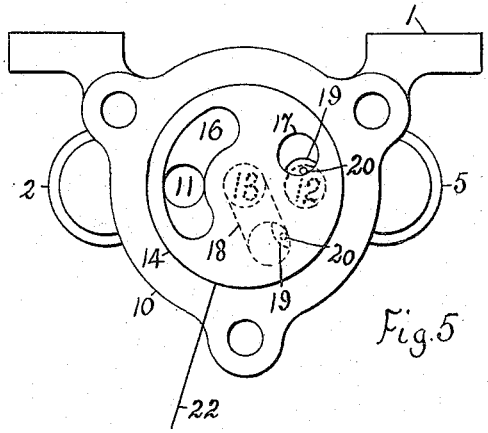
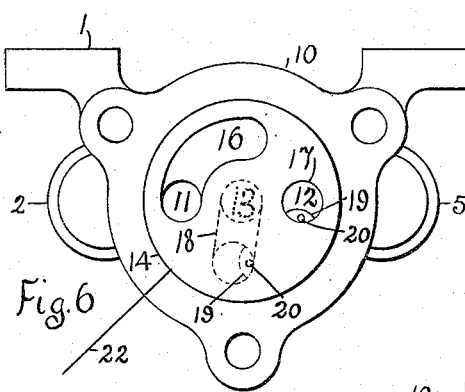
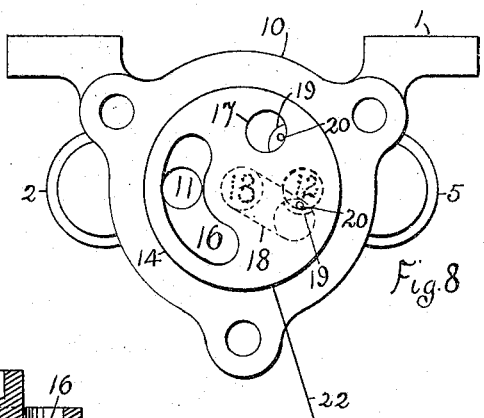
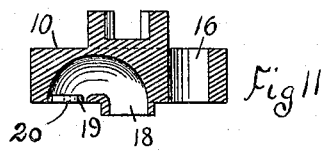
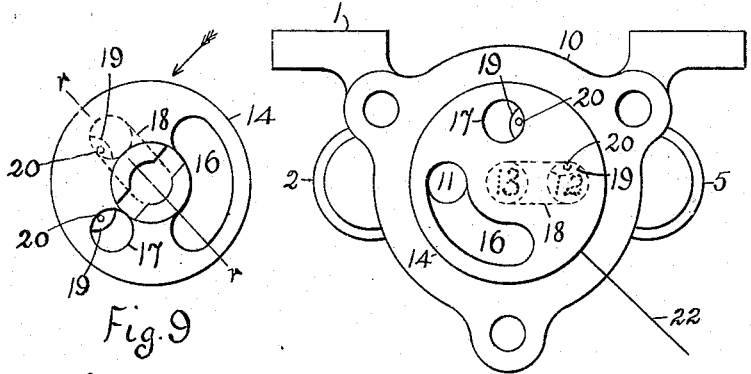

UNITED STATES PATENT OFFICE.

WILLIAM K. RANKIN, OF PHILADELPHIA, PENNSYLVANIA, ASSIGNOR TO JOHN E. REYBURN, OF PHILADELPHIA, PENNSYLVANIA.

ENGINEER'S VALVE FOR TRAIN-BRAKES.

942,280.

Specification of Letters Patent. Patented Dec. 7, 1909.

Application filed January 15, 1909. Serial No. 472,397.

*To all whom it may concern:*

Be it known that I, WILLIAM K. RANKIN, a citizen of the United States, residing at Philadelphia, in the county of Philadelphia and State of Pennsylvania, have invented certain new and useful Improvements in Engineers' Valves for Train-Brakes; and I do hereby declare the following to be a full, clear, and exact description of the invention, such as will enable others skilled in the art to which it appertains to make and use the same.

This invention is for a means for the control of the triple valve of an automatic system, of air brakes, as used for electric cars.

The improvements consist of a rotatable valve subjected to reservoir pressure, which prevents leakages, and which permits constant reservoir pressure within the valve case; the employment of diminutive auxiliary ports within the valve ports which are in communication with the reservoir through the interior of the case and the train pipe, and the train pipe and the exhaust. Also means whereby the valve operative handle is restricted to and positively set to place the valve in lap position; recharge of the auxiliary reservoir and gradual release; quick release; gradual application, and for emergency application.

By the constructions enumerated the operator is aided in the correct and most efficient use of the brake without wasting the air pressure, and thereby a greater economy is obtained in the amount of electric current required to produce the needed air pressure.

The invention is illustrated in the accompanying drawings, wherein similar parts are designated by the same reference characters, in which, Figure 1, is a top view. Fig. 2, is a section on line *x x* Fig. 1, as to most parts. Fig. 3, is a section on line *s s* Fig. 1 of the base plate and valve seat. Fig. 4 is a top view of the valve and base plate with the valve in lap position. Fig. 5 is a view of the valve in position for a recharge of the auxiliary reservoir and a graduated release; Fig. 6 is a view of the valve in position for a quick release; Fig. 7 is a view of the valve in position for an emergency application; Fig. 8 is a view of the valve in position for a graduated application; Fig. 9 is a top view of the valve; Fig. 10 is a bottom view of the valve; Fig. 11 is a section of the valve on line *r r* Fig. 9.

A base plate 1 has a neck 2 with a port 3 to which is attached the reservoir pipe 4, a neck 5 with a port 6 to which is attached the train pipe 7, and an exhaust port 8 to which may be attached (or not) a pipe 9. A valve seat 10 is secured on base plate 1, and therethrough are ports 11, 12, 13 coinciding with ports 3, 6, 8 in the base plate. Mounted above the valve seat 10 is the rotatable valve 14, inclosed by case 15. Valve 15 has a curvilinear port 16 therethrough, which in all stages of the valve's positions permits full pressure from the reservoir to pass to and occupy the interior of case 15, above valve 14, and a through port 17 permit the passage of pressure from the reservoir, through case 15 to train pipe 7, and an internal port 18, excluded from reservoir pressure, and adapted to connect train pipe 7 with the exhaust 13—8. Ports 17, 18 are provided with inward projections 19 adapted to cover a portion of port 12 during certain positions of valve 14, as seen in Figs. 5, 8, and through the projections 19 there are small auxiliary ports 20, to restrict the passage of fluid pressure as in Fig. 5 for a graduated recharge of the auxiliary reservoir and brake release, and as in Fig. 8 for a graduated application.

The valve 14 is operated by a stem 21 to which is removably attached a handle 22 with new elements to operate the valve in manner for more uniform efficiency in reducing sudden shocks, more economical use of the air pressure, and a consequent saving of electrical power to produce the pressure. The means employed are a flange 23 projecting from the neck 24 of case 15 with indentures 25, 26, 27, 28, 29 into which a roller 30 is resiliently pressed by a spring 31, and rotatively secured in a reciprocating shell 32, guided from turning by a slot 33 and a screw 34 which enters the slot. The indenture 25 controls the valve in lap position, the flow of pressure from the reservoir to the train pipe being cut off as seen in Fig. 4; 26 controls the valve in graduated application, when train pipe 7, ports 6, 12 auxiliary port 20 and ports 18, 13, 8 permit a limited flow to exhaust pipe 9, as seen in Fig. 8; 27 controls the valve in an emergency application, when ports 6, 12 are open to ports 18, 13, 8 and the train pipe as seen in Fig. 7; 28 controls the valve for a full release, when ports 3, 11, 16 are connected to ports 17, 12, 6 as seen in Fig. 6; 29 controls the valve for a graduated release when ports 3, 11, 16, 17 and auxiliary port 20 permit a graduated flow through ports 12, 6 to train pipe 7, as seen in Fig. 5. In every position of the valve 14 the interior of case 15 is charged with full reservoir pressure, port 16 being always open to permit free flowing from pipe 4 and ports 3, 11 to the case.

I claim—

1. In an engineer's valve for train brakes, the combination of a case with connections thereto from an air reservoir and a train pipe, and having an exhaust passage; a valve seat with ports coöperating with the connections and the exhaust; an upper part inclosing the valve seat and forming a passage from the reservoir to the train pipe; a valve rotatable on the seat and having a curvilinear through port from the reservoir to the case, a through port for the train pipe, an interior port from the train pipe to the exhaust port, and within each train pipe port a projection containing an auxiliary port adapted to limit the flow of fluid pressure when placed in connection with the train pipe port for a graduated release, and a graduated application, and means to operate the valve.

2. In an engineer's valve, a casing base with connections and ports for a reservoir, a train pipe and an exhaust; a valve seat with corresponding and coöperative ports; a case above the valve seat; a rotatable valve having an elongated through port from the reservoir ports in the base and valve seat, to the interior of the case; an oppositely disposed through port coöperating with the base and seat ports, opening into the case, and therein a ledge with an auxiliary port; an interior port adapted to connect the train pipe and exhaust ports of the base and seat, and therein a ledge with an auxiliary port, and means to rotate the valve.

3. In an engineer's valve, a case with connections and passages to a reservoir, a train pipe and an exhaust; a rotatable disk valve controlling the passages, a stem connected to the valve, a handle removably connected to the stem and a resiliently supported roller therefor; a projecting flange on the case and indentures therein adapted to be engaged by the roller aforesaid to positively control the operative positions of the valve.

4. In an engineer's valve, a case comprising an upper inclosing part; a lower part with reservoir, train pipe and exhaust passages and connections; an interposed valve seat with coöperative passages; a rotatable valve inclosed by the case, mounted on the valve seat and having means for its rotation; a port through the valve affording continuous communication between the reservoir connections and the interior of the case; a port through the valve adapted to open communication between case and the train pipe, and an auxiliary port therein; a port wholly within the valve, adapted to connect the train pipe and the exhaust and an auxiliary port therein.

5. In an engineer's valve, a case comprising a base part with connections and ports for a reservoir, a train pipe and an exhaust; a valve seat with corresponding parts; and a valve inclosing part; a rotatable valve in the case with a non intercepting port for the reservoir, a port for the train pipe and an auxiliary port therein, an interior port for the train pipe and the exhaust and an auxiliary port therein; means to rotate the valve for restricted passage and full passage from the case to the train pipe, and restricted passage and full passage from the train pipe to the exhaust, said rotative means being positively controlled for the different operative positions of the valve by resiliently supported devices engaging indentations or depressions provided for such control of the valve.

6. In an engineer's valve, a receptacle for the valve having connections from a reservoir and a train pipe, and an exhaust; a valve within the receptacle permitting uninterrupted flow from the reservoir to the receptacle, a port in the valve open to the receptacle and adapted upon the rotation of the valve in one direction and position to deliver full pressure, and in another position to deliver a restricted pressure to the train pipe; an internal port excluded from reservoir pressure, and when the rotation of the valve is reversed in one position adapted to connect the train pipe and the exhaust for full pressure flowing, and in another position for a restricted flow; and means whereby the operator is guided to positively set the valve in lap position, recharge and gradual release, quick release, gradual and emergency applications.

In testimony whereof I affix my signature, in the presence of two witnesses.

WILLIAM K. RANKIN.

Witnesses:
CHARLES E. WILLIAMS,
R. C. WRIGHT.